United States Patent
Graff et al.

(10) Patent No.: US 11,909,800 B2
(45) Date of Patent: Feb. 20, 2024

(54) METHOD, SYSTEM AND COMPUTER PROGRAM PRODUCT FOR INITIATING DOWNSPEEDING IN A VIDEOCONFERENCING SESSION

(71) Applicant: Pexip AS, Oslo (NO)

(72) Inventors: Håvard Graff, Oslo (NO); Tulio Beloqui, Oslo (NO); Knut Inge Hvidsten, Oslo (NO)

(73) Assignee: Pexip AS, Oslo (NO)

( * ) Notice: Subject to any disclaimer, the term of this patent is extended or adjusted under 35 U.S.C. 154(b) by 0 days.

(21) Appl. No.: 17/989,101

(22) Filed: Nov. 17, 2022

(65) Prior Publication Data
US 2023/0156064 A1 May 18, 2023

(30) Foreign Application Priority Data
Nov. 18, 2021 (NO) .................................. 20211386

(51) Int. Cl.
*H04L 65/75* (2022.01)
*H04L 47/263* (2022.01)
*H04L 47/27* (2022.01)
*H04L 47/283* (2022.01)

(52) U.S. Cl.
CPC .......... *H04L 65/762* (2022.05); *H04L 47/263* (2013.01); *H04L 47/27* (2013.01); *H04L 47/283* (2013.01)

(58) Field of Classification Search
CPC ..... H04L 47/263; H04L 47/27; H04L 47/283; H04L 47/19; H04L 47/10; H04L 47/25
See application file for complete search history.

(56) References Cited

U.S. PATENT DOCUMENTS

| | | |
|---|---|---|
| 2002/0010938 A1 | 1/2002 | Zhang et al. |
| 2003/0152032 A1* | 8/2003 | Yanagihara ...... H04N 21/64769 370/235 |
| 2007/0236599 A1* | 10/2007 | van Beek ............. H04N 7/163 348/419.1 |
| 2008/0120424 A1 | 5/2008 | Deshpande |
| 2010/0274872 A1 | 10/2010 | Harrang et al. |
| 2011/0026414 A1 | 2/2011 | Banerjee |
| 2013/0159495 A1* | 6/2013 | Wang .................. H04N 19/146 709/224 |
| 2014/0112120 A1 | 4/2014 | Kim et al. |
| 2016/0192233 A1 | 6/2016 | Sarker et al. |
| 2016/0212032 A1* | 7/2016 | Tsuruoka ............ H04L 47/283 |
| 2019/0058666 A1* | 2/2019 | Pudlewski ............ H04L 47/27 |
| 2021/0211368 A1* | 7/2021 | Zheng ................ H04L 43/0858 |

(Continued)

FOREIGN PATENT DOCUMENTS

| | | |
|---|---|---|
| EP | 2019522 A2 | 1/2009 |
| WO | 2014160926 A1 | 10/2014 |

OTHER PUBLICATIONS

Norwegian Industrial Property Office, Norwegian Search Report for corresponding Norwegian Application No. 20220967, dated Nov. 9, 2022, 2 pages.

(Continued)

*Primary Examiner* — David R Lazaro
(74) *Attorney, Agent, or Firm* — Christopher & Weisberg, P.A.

(57) ABSTRACT

A system and method of downspeeding a media stream transmitted over a communication link from a sender device to a receiving device.

15 Claims, 4 Drawing Sheets

(56) References Cited

U.S. PATENT DOCUMENTS

| | | | | |
|---|---|---|---|---|
| 2021/0360475 A1* | 11/2021 | Wittberg | ............... | H04W 28/10 |
| 2022/0255866 A1 | 8/2022 | Guo et al. | | |
| 2023/0155945 A1* | 5/2023 | Graff | ................... | H04L 47/2416 |
| | | | | 370/235 |
| 2023/0156064 A1* | 5/2023 | Graff | ................... | H04L 47/283 |
| | | | | 709/231 |
| 2023/0171299 A1* | 6/2023 | Graff | ................... | H04L 1/0009 |
| | | | | 709/217 |

OTHER PUBLICATIONS

Norwegian Industrial Property Office, Norwegian Search Report for corresponding Norwegian Application No. 20211386, dated May 2, 2022, 2 pages.

European Patent Office, International Type Search Report for corresponding Norwegian Application No. 20211386, dated Nov. 18, 2021, dated Jun. 24, 2022, 13 pages.

Jaehyun Kim et al., "TCP CAE: An Improved Congestion Control Using Comparative ACK-Based Estimator", The Journal of Supercomputing, Kluwer Academic Publishers, BO, vol. 59, No. 2, Sep. 22, 2010, pp. 1019-1034, XP019990682.

Holmer H. Lundin et al., "A Google Congestion Control Algorithm For Real-Time Communication; draft-ietf-rmcat-gcc-02.txt" Internet Society (ISOC), Jul. 8, 2016, pp. 1-19, XP015114236.

European Patent Office, European Search Report for corresponding Application No. EP 22207372.8, dated Mar. 27, 2023, 11 pages.

European Patent Office, European Search Report for corresponding Application No. EP 22207369.4, dated Mar. 27, 2023, 12 pages.

Wenbo Liang et al., Research on Streaming Media Adaptive Congestion Control Technology, 2018 International Conference on Sensor Networks and Signal Processing (SNSP), Oct. 28, 2018, pp. 482-485.

* cited by examiner

METHOD, SYSTEM AND COMPUTER PROGRAM PRODUCT FOR INITIATING DOWNSPEEDING IN A VIDEOCONFERENCING SESSION

CROSS-REFERENCE TO RELATED APPLICATION

This application is related to and claims priority to Norwegian Patent Application No. 20211386, filed Nov. 18, 2021, the entirety of which is incorporated herein by reference.

FIELD

The present invention relates video conferencing, in particular to providing a method, system and computer program product for downspeeding a media stream transmitted over a communication link from a sender device to a receiving device.

BACKGROUND

Transmission of audio and moving pictures in real-time is employed in several applications like e.g. video conferencing, team collaboration software, net meetings and video telephony. Terminals and endpoints being able to participate in a conference may be traditional stationary video conferencing endpoints, external devices, such as mobile and computer devices, smartphones, tablets, personal devices and PCs, and browser-based video conferencing terminals.

Video conferencing systems allow for simultaneous exchange of audio, video and data information among multiple conferencing sites. For performing multipoint video conferencing, there usually is a Multipoint Conferencing Node (MCN) that provides switching and layout functions to allow the endpoints and terminals of multiple sites to intercommunicate in a conference. Such nodes may also be referred to as Multipoint Control Units (MCUs), Multi Control Infrastructure (MCI), Conference Nodes and Collaborations Nodes (CNs). MCU is the most commonly used term, and has traditionally has been associated with hardware dedicated to the purpose, however, the functions of an MCN could just as well be implemented in software installed on general purpose servers and computers, so in the following, all kinds of nodes, devices and software implementing features, services and functions providing switching and layout functions to allow the endpoints and terminals of multiple sites to intercommunicate in a conference, including (but not excluding) MCUs, MCIs and CNs are from now on referred to as MCNs.

The MCN links sites, endpoints and participants together by receiving conference signals from the sites/endpoints, processing the received signals, and transmitting the processed signals to appropriate sites/endpoints. The conference signals include audio, video, data and control information. The MCN processes the received conference signals from one or more sites/endpoints based on the requirements/capabilities of each site/endpoint receiving signals from the MCN.

FIG. 1 schematically illustrates multi-point videoconferencing system 100 with three videoconferencing terminals 101, 102, 103 in communication with a multipoint conferencing node (MCN) 104. In the multi-point videoconferencing system 100 media passes through the MCN 104. Input audio and video 101a, 102a, 103a captured at the videoconferencing terminals 101, 102, 103 is transmitted to the MCN 104, mixed with the audio and video from the other videoconferencing terminals, and the mixed audio and video 101b, 102b, 103b is transmitted back to the videoconferencing terminals 101, 102, 103.

A transcoding MCN comprises a plurality of encoders that may translate signals from one video or audio codec to another codec, change picture size, change video quality, change audio quality, change bitrate, combine conference signals from multiple participants into various layouts etc.

A switching MCN receives video and audio from each site/endpoint in a plurality of audio qualities, video qualities, picture sizes, and corresponding bitrates, and the switching MCU forwards audio and media streams to other sites/endpoints based on their capabilities and/or requirements. A switching MCN may for example receive four different media stream resolutions; 1080 p: 5000 Kbps video, 256 Kbps audio, 720 p: 2500 Kbps video, 256 Kbps audio, 560 p: 1500 Kbps video, 256 Kbps audio, and/or 360 p: 500 Kbps video, 128 Kbps audio.

Network resources are in general limited. A video conferencing session may occupy a considerable part of available network resources, in particular in home-networks, when the media transmitted from the MCN are of high quality and/or sent with high bitrates. Congestion occurs when more data is sent than a receiving network is capable of receiving. In this state packet delay and packet loss occur, and the quality of service is poor. A participant in a video conferencing session on a congested network may then experience frozen images, broken audio etc. The participant may perceive this as a problem at the video conferencing service provider, e.g. the MCN, even when it the participant's home network that is to blame. It is therefore necessary to provide congestion control at the sender side to avoid sending more data than a network path to a receiver can handle. The sender side may then need to reduce the sent bitrate, i.e. perform downspeeding of the video conferencing link between the MCN and the participant/endpoint. Downspeeding can be defined as adjusting the bit rate down for adapting to reduced available bandwidths, when encoding media at multiple bit rates is possible.

FIG. 2 is a schematic illustration of a prior art message flow 200 between a sender device 201 and a receiving device 202, the sender device transmitting a media stream 203 over a communication link to the receiving device 202. Transport-wide Congestion Control (TWCC) is an extension of the Real-time Transport Protocol (RTP) and Real-Time Transport Control Protocol (RTCP) for use in congestion control algorithms for RTP-based media flow. The packets of the media stream 203 comprises a RTP header extension containing a transport-wide packet sequence number, i.e. a packet identifier. TWCC proposes that the receiving device transmits an RTCP feedback message 204 feeding back the arrival times and sequence numbers of the packets of the media stream 203 received over the connection. The sender device keeps a map of in-flight packets, and upon receiving the feedback message 204 looks up the transmission timestamp of the corresponding packet. From these two timestamps the sender can compute metrics such as inter-packet delay variation and estimated queueing delay.

One prior art implementation of TWCC for congestion control is the Google Congestion Control (GCC) algorithm. In this algorithm an inter-arrival time, $t(i)-t(i-1)$, is defined as the difference in arrival time of two packets or two groups of packets. Correspondingly, an inter-departure time, $T(i)-T(i-1)$, is defined as the difference in departure-time of two packets or two groups of packets. The GCC algorithm determines that congestion is present when the inter-arrival time is larger than the inter-departure time. A problem with the GCC algorithm is that it is very sensitive for network jitter, thus the GCC algorithm may determine that the connection between sender and receiver is congested and initiate downspeeding when there is no congestion. This will reduce the quality of the video conferencing session when there really was no need to do so, hence reducing the user experience for a participant in the video conferencing session.

It is therefore a need in the art for a system and method for sender side congestion determination and sender side initiated downspeeding of a media stream transmitted over a communication link from the sender device to a receiving device.

SUMMARY

In view of the above, an object of the present invention is to overcome or at least mitigate drawbacks of prior art video conferencing systems.

In a first aspect the invention provides a method of downspeeding a media stream transmitted over a communication link from a sender device to a receiving device, the method comprising the steps of:
  mapping for each packet in the media stream a packet identifier, a transmission timestamp and a packet size;
  transmitting for each packet received at the receiving device a feedback message to the sender device, the feedback message comprising the packet identifier and an arrival timestamp;
  determining a transmission rate for a first sliding window of N transmitted packets by dividing a packet size sum of the N transmitted packets with a time difference between a transmission time stamp of the last of the N transmitted packets and a transmission time stamp of the first of the N transmitted packets;
  determining a received rate for the first sliding winding of the N transmitted packets by dividing the packet size sum of the N transmitted packets with a time difference between the arrival time stamp of the last of the N transmitted packets and the arrival time stamp of the first of the N transmitted packets; and initiating downspeeding of the media stream when for the first sliding window of the N transmitted packets the difference between the transmission rate and the received rate divided by the transmission rate is above a first downspeeding threshold.

In one embodiment, the first downspeeding threshold may be in the range 0.1-0.4, preferably 0.25.

The present invention provides an accurate and instant decision of downspeeding at an optimal timing and to an optimal extent. When network conditions are getting poor, a decision of downspeeding and to which amount, is made. The time of downspeeding is tuned not to occur too early to prevent unnecessary degrading of quality due to e.g. short bursts of packet loss, but at the same time not too late to prevent fatal quality problems like image freeze or audio outages. The downspeeding amount is also tuned optimally according to the current bandwidth conditions to avoid lowering the quality more than necessary. The aspects of the present invention will therefore result in a video conferencing, which is much more robust to changes in network and bandwidth condition, and by that a better user experience. The present invention is for example resistant to network jitter such that the sender device does not downspeed the media stream when there is no congestion.

In one embodiment, the method may further comprise the steps of:
  transmitting recovery packets into the media stream, each recovery packet adapted to replace a missing packet of the media stream;
  mapping for each recovery packet the packet identifier of the recovery packet and the packet identifier of the packet the recovery packet is adapted to replace;
  determining a packet as missing when none of the feedback messages comprises the packet identifier of the packet;
  determining a packet as recovered when a feedback message comprises the packet identifier of a recovery packet corresponding to the missing packet; and
  determining a packet recovery success rate by dividing a total number of packets determined as recovered within a second sliding window with a total number of packets determined as missing within the second sliding window; and
  initiating downspeeding of the media stream when the packet recovery success rate is below a second downspeeding threshold.

In one embodiment, the second downspeeding threshold may be in the range 0.6-1.0, preferably 0.8.

In one embodiment, the method may further comprise the step of measuring a round trip delay from the receiving device requests a recovery packet to the feedback message comprises the packet identifier of the recovery packet, and waiting the at least one round trip delay before determining the packet recovery rate.

In one embodiment, the step of initiating downspeeding of the media stream may comprise instructing an encoder to reduce the transmission rate of the media stream.

In one embodiment, the step of initiating downspeeding of the media stream may comprise selecting a media stream having a lower transmission rate than another media stream from an encoder providing a plurality of media streams at different transmission rates.

In a second aspect the invention provides a system for downspeeding of a media stream transmitted over a communication link from a sender device to a receiving device, the system being adapted to:
  mapping, with the sender device, for each packet in the media stream a packet identifier, a transmission timestamp and a packet size;
  transmitting for each packet received at the receiving device a feedback message to the sender device, the feedback message comprising the packet identifier and an arrival timestamp;
  determining, with the sender device, a transmission rate for a first sliding window of N transmitted packets by dividing a packet size sum of the N transmitted packets with a time difference between a transmission time stamp of the last of the N transmitted packets and a transmission time stamp of the first of the N transmitted packets;
  determining, with the sender device, a received rate for the first sliding winding of the N transmitted packets by dividing the packet size sum of the N transmitted packets with a time difference between the arrival time stamp of the last of the N transmitted packets and the arrival time stamp of the first of the N transmitted packets; and
  initiating, with the sender device, downspeeding of the media stream when for the first sliding window of the N transmitted packets the difference between the transmission rate and the received rate divided by the transmission rate is above a first downspeeding threshold.

In one embodiment, the first downspeeding threshold may be in in the range 0.1-0.4, preferably 0.25.

In one embodiment, the sender device may be further adapted to:

transmitting recovery packets into the media stream, each recovery packet adapted to replace a missing packet of the media stream;

mapping for each recovery packet the packet identifier of the recovery packet and the packet identifier of the packet the recovery packet is adapted to replace;

determining a packet as missing when none of the feedback messages comprises the packet identifier of the packet;

determining a packet as recovered when a feedback message comprises the packet identifier of a recovery packet corresponding to the missing packet; and determining a packet recovery success rate by dividing a total number of packets determined as recovered within a second sliding window with a total number of packets determined as missing within the second sliding window; and initiating downspeeding of the media stream when the packet recovery success rate is below a second downspeeding threshold.

In one embodiment, the second downspeeding threshold may be in the range 0.6-1.0, preferably 0.8.

In one embodiment, the sender device may be further adapted to measuring a round trip delay from the receiving device requests a recovery packet to the feedback message comprises the packet identifier of the recovery packet, and waiting the at least one round trip delay before determining the packet recovery rate.

In one embodiment, the sender device may be further adapted to instructing an encoder to reduce the transmission rate of the media stream.

In one embodiment, the sender device may be further adapted to selecting a media stream having a lower transmission rate than another media stream from an encoder providing a plurality of media streams at different transmission rates.

In a third aspect the invention provides a computer program product comprising instructions that when executed on a processor performs the method of the first aspect of the invention.

DETAILED DESCRIPTION

According to embodiments of the present invention as disclosed herein, the above-mentioned disadvantages of solutions according to prior art are eliminated or at least mitigated.

Figure 1:
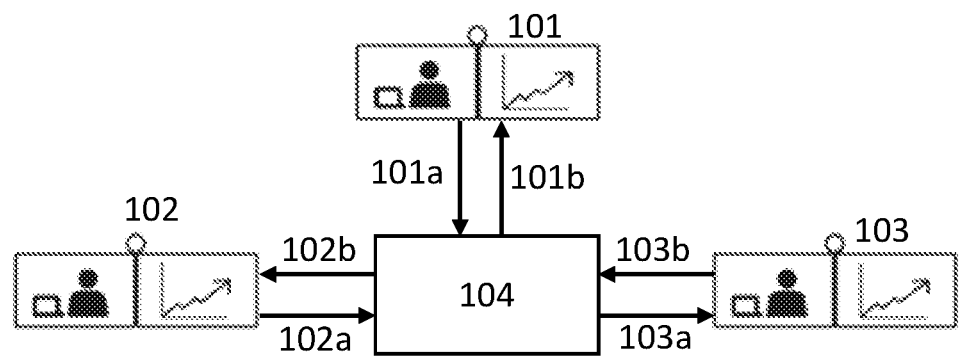
FIG. 1 is a schematic illustration of a multi-point videoconferencing system.
Figure 2:
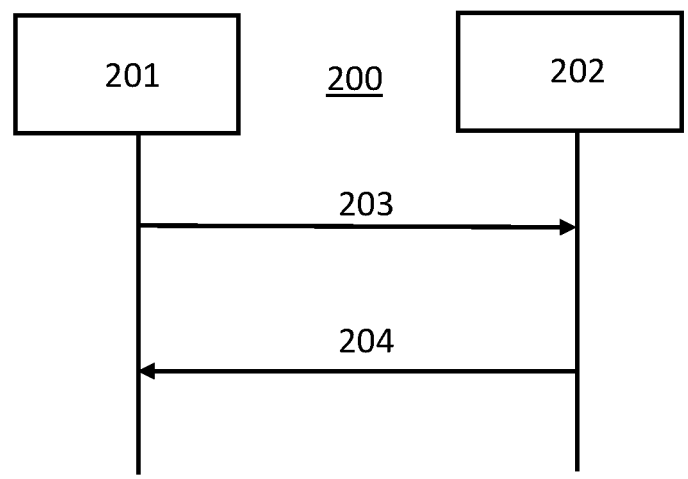
FIG. 2 is a schematic illustration of a message flow between a sender device and a receiving device.
Figure 3:
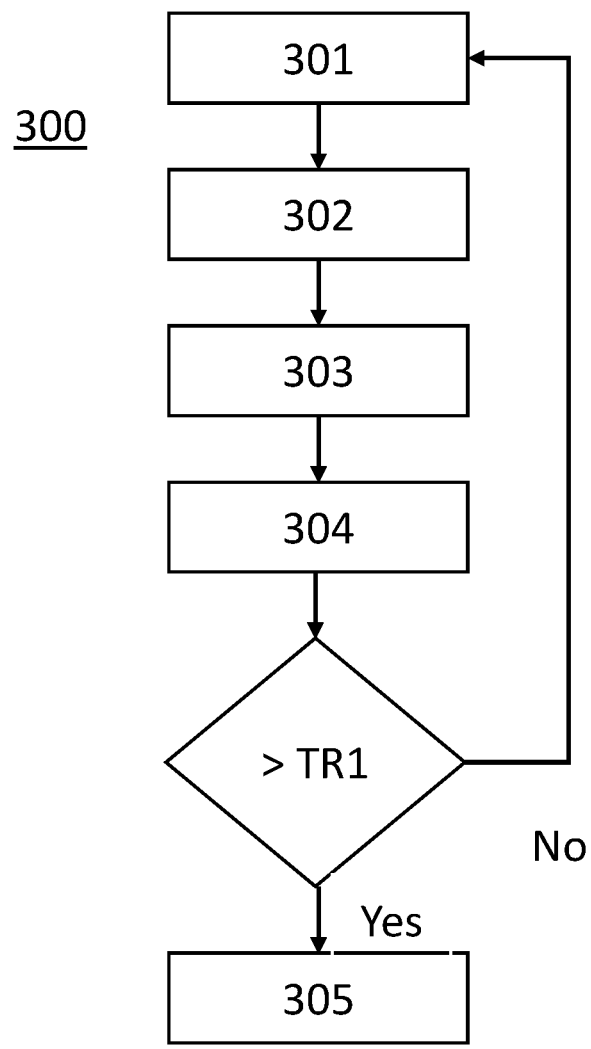
FIG. 3 is an exemplary flowchart illustrating an exemplary embodiment of the present invention.

FIG. 3 is a schematic illustration of an exemplary method 300 of downspeeding a media stream transmitted over a communication link from the sender device 201 to the receiving device 202 in a multi-point videoconferencing system 100. The sender device 201 is preferably a MCN 104, however, the method 300 may also be performed by a videoconferencing endpoint 101a, 101b, 101c. The first step 301 comprises mapping for each packet in the media stream 203 a packet identifier, a transmission timestamp and a packet size. The packet identifier and the transmission timestamp may in one embodiment be implanted according to the definitions of TWCC. The packet size is a measurement of the size of the packet in the media stream in e.g. bits or bytes. The next step 302 comprises transmitting for each packet received at the receiving device 202 a feedback message 204 to the sender device 201, the feedback message 204 comprising the packet identifier and an arrival timestamp. Thus, the receiving device 202 determines the arrival time of each packet in the media stream 203 and returns the arrival time in the arrival timestamp of the feedback message 204

Then, in the next step 303, the sender device 201 determines a transmission rate for a first sliding window of N transmitted packets by dividing a packet size sum of the N transmitted packets with a time difference between a transmission time stamp of the last of the N transmitted packets and a transmission time stamp of the first of the N transmitted packets. The transmission rate is typically determined in bits/second.

When determining the transmission rate for the first sliding window of N transmitted packets, the transmission rate is determined for consecutive windows of length N each time a new packet is transmitted from the sender device 201. The first sliding window of N transmitted packets may in one embodiment be the number of packets, e.g. 25 packets, or a time frame, e.g. 100 ms. Similarly, in the next step 304, the sender device 201 determines a received rate for the first sliding winding of the N transmitted packets by dividing the packet size sum of the N transmitted packets with a time difference between the arrival time stamp of the last of the N transmitted packets and the arrival time stamp of the first of the N transmitted packets.

Then in step 305, the sender device 201 initiates downspeeding of the media stream 203 when for the first sliding window of the N transmitted packets the difference between the transmission rate and the received rate divided by the transmission rate is above a first downspeeding threshold, TR1, i.e. norm_rate_delta>TR1, where:

norm_rate_delta=(transmission rate−received rate)/(transmission rate).

The first downspeeding threshold, TR1, is in the range 0.1-0.4, preferably 0.25. One advantage of determining to initiate downspeeding based on calculations of transmitted and received transmission rate is that the determination is resistant to network jitter such that the sender device 201 does not downspeed the media stream 203 when there is no congestion.

If the sender device 201 comprises and encoder, e.g. is a transcoding MCN 104 or a videoconferencing endpoint 101a, 101b, 101c, then the step of initiating downspeeding of the media stream 203 comprises instructing the encoder to reduce the transmission rate of the media stream.

In the sender device 201 does not comprises an encoder, e.g. a switching MCN 104, then the step of initiating downspeeding of the media stream comprises selecting and forwarding a media stream having a lower transmission rate than another media stream from an encoder providing a plurality of media streams at different transmission rates.

A norm_rate_delta value above the first downspeeding threshold indicates that there is congestion over the communication link between the sender device 201 and the receiving device 202. However, a norm_rate_delta value may also be due to a high constant packet loss over the communication link. Packet loss resilience methods such as Forward Error Correction (FEC) and RTP retransmission (RTX) transmits recovery packets into the media stream 203, each recovery packet adapted to replace a missing packet of the media stream 203, such that the participants in the video conferencing session does not experience frozen images etc. Downspeeding the media stream 203 in such a situation would reduce, rather than increase, the quality of service for a participant on the lossy network.

Figure 4:
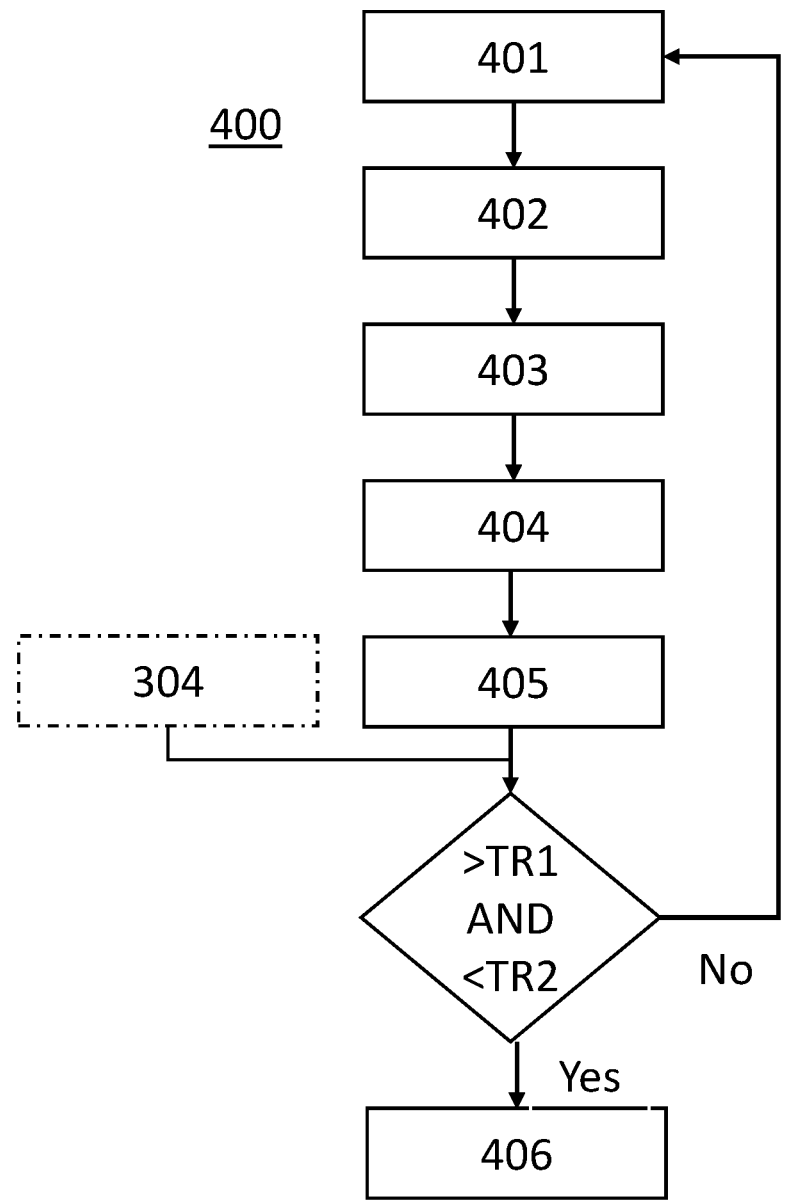
FIG. 4 is an exemplary flowchart illustrating an exemplary embodiment of the present invention.

FIG. 4 is a schematic illustration of an exemplary method 400 of downspeeding a media stream transmitted over a communication link from the sender device 201 to the receiving device 202 in a multi-point videoconferencing system 100. The first step 401 comprises transmitting recovery packets into the media stream 203, each recovery packet adapted to replace a missing packet of the media stream 203. Similar to step 301, the next step 402 comprises mapping for each recovery packet the packet identifier of the recovery packet as in step 301 and, in addition, the packet identifier of the packet the recovery packet is adapted to replace. In the same step 302 as for the regular media stream packets, the feedback message 204 is transmitted for each recovery packet to the sender device 201, the feedback message 204 comprising the packet identifier and the arrival timestamp.

In the next step 403, the sender device 201 determines a packet as missing when none of the feedback messages 204 comprises the packet identifier of the packet. Then in step 404, the sender device determines a packet as recovered when a feedback message 204 comprises the packet identifier of a recovery packet corresponding to the missing packet.

Then in step 405, the sender device 201 determines a packet recovery success rate by dividing a total number of packets determined as recovered within a second sliding window with a total number of packets determined as missing within the second sliding window, and then in step 406 initiating downspeeding of the media stream 203 when the packet recovery success rate is below a second downspeeding threshold, TR2, and the norm_rate_delta is above the first downspeeding threshold, TR1.

packet_recovery_success_rate=(number of recovered packets)/(number of missing packets).

The second downspeeding threshold, TR2, is in the range 0.6-1.0, preferably 0.8.

The method 400 of determining the packet recovery success rate, may in one embodiment further comprising the step of measuring a round trip delay from the receiving device 202 requests a recovery packet to the feedback message 204 comprises the packet identifier of the recovery packet, and waiting the at least one round trip delay before determining the packet recovery rate. The measurement of the round-trip delay gives packet loss resilience methods time to recover the missing packet before performing the determination.

Figure 5:
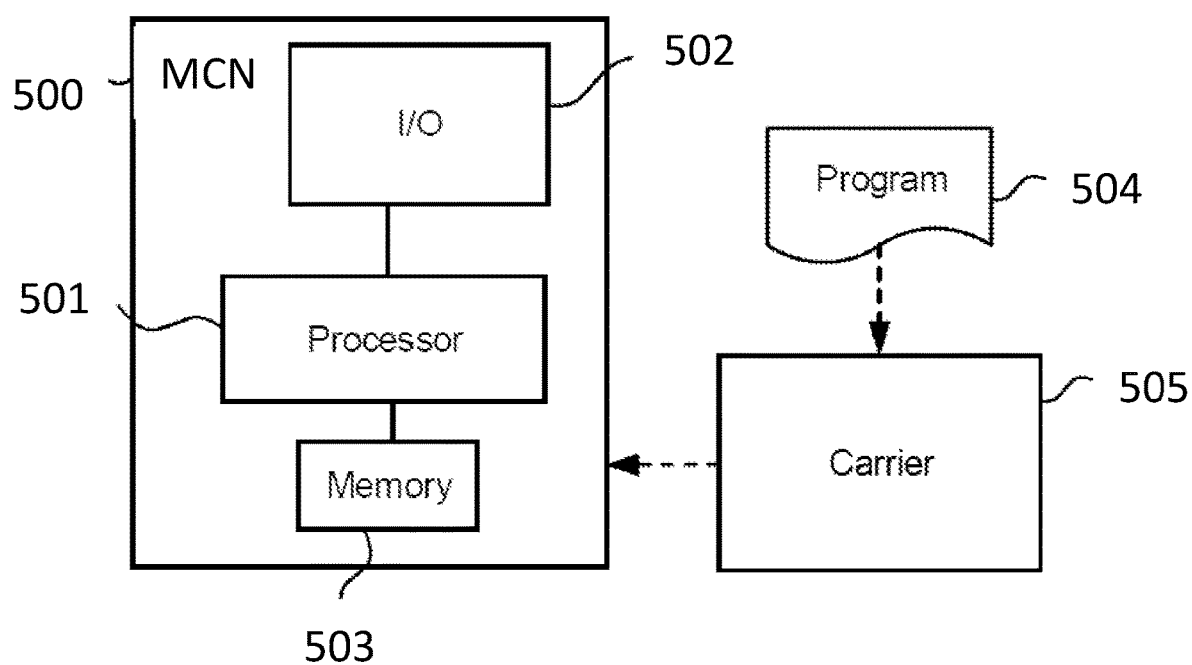
FIG. 5 is a schematically illustration of an exemplary sender device of the present invention.

Turning now to FIG. 5, a schematically illustrated multipoint conferencing node (MCN) 500. The MCN 500 comprises an input/output circuitry 502, at least one processor 501 and a memory 503. The memory 503 contains instructions executable by the processor 501, cause the MCN 500 to:
  mapping for each packet in the media stream a packet identifier, a transmission timestamp and a packet size;
  transmitting for each packet received at the receiving device a feedback message to the sender device, the feedback message comprising the packet identifier and an arrival timestamp;
  determining a transmission rate for a first sliding window of N transmitted packets by dividing a packet size sum of the N transmitted packets with a time difference between a transmission time stamp of the last of the N transmitted packets and a transmission time stamp of the first of the N transmitted packets;
  determining a received rate for the first sliding winding of the N transmitted packets by dividing the packet size sum of the N transmitted packets with a time difference between the arrival time stamp of the last of the N transmitted packets and the arrival time stamp of the first of the N transmitted packets; and
  initiating downspeeding of the media stream when for the first sliding window of the N transmitted packets the/a difference between the transmission rate and the received rate divided by the transmission rate is above a first downspeeding threshold.

The instructions that are executable by the processor 501 may be software in the form of a computer program 504. The computer program 504 may be contained in or by a carrier 505, which may provide the computer program 501 to the memory 503 and processor 501. The carrier 505 may be in any suitable form including an electronic signal, an optical signal, a radio signal or a computer readable storage medium.

As used herein, the term "computer readable medium" may be a universal serial bus (USB) memory, a digital versatile disc (DVD), a Blu-ray disc, a software module that is received as a stream of data, a Flash memory, a hard drive, a memory card, such as a MemoryStick, a multimedia card (MMC), secure digital (SD) card, etc. One or more of the aforementioned examples of computer readable medium may be provided as one or more computer program products.

In the preceding description, various aspects of the method and imaging processing device according to the invention have been described with reference to the illustrative embodiment. For purposes of explanation, specific numbers, systems and configurations were set forth in order to provide a thorough understanding of the system and its workings. However, this description is not intended to be construed in a limiting sense. Various modifications and variations of the illustrative embodiment, as well as other embodiments of the method and image processing device, which are apparent to persons skilled in the art to which the disclosed subject matter pertains, are deemed to lie within the scope of the present claims.

What is claimed is:

1. A method of downspeeding a media stream transmitted over a communication link from a sender device to a receiving device, the method comprising the steps of:
  mapping for each packet in the media stream a packet identifier, a transmission timestamp and a packet size;
  receiving for each packet received at the receiving device a feedback message, the feedback message comprising the packet identifier and an arrival timestamp;
  determining a transmission rate for a first sliding window of N transmitted packets by dividing a packet size sum of the N transmitted packets with a time difference between the transmission time stamp of the last of the N transmitted packets and the transmission time stamp of the first of the N transmitted packets;

determining a received rate for the first sliding winding of the N transmitted packets by dividing the packet size sum of the N transmitted packets with a time difference between the arrival time stamp of the last of the N transmitted packets and the arrival time stamp of the first of the N transmitted packets; and initiating downspeeding of the media stream when for the first sliding window of the N transmitted packets the difference between the transmission rate and the received rate divided by the transmission rate is above a first downspeeding threshold.

2. The method of claim 1, wherein the method further comprising the steps of transmitting recovery packets into the media stream, each recovery packet adapted to replace a missing packet of the media stream;

mapping for each recovery packet the packet identifier of the recovery packet and the packet identifier of the packet the recovery packet is adapted to replace;

determining a packet as missing when none of the feedback messages comprises the packet identifier of the packet;

determining a packet as recovered when a feedback message comprises the packet identifier of a recovery packet corresponding to the missing packet; and determining a packet recovery success rate by dividing a total number of packets determined as recovered within a second sliding window with a total number of packets determined as missing within the second sliding window; and initiating downspeeding of the media stream when the packet recovery success rate is below a second downspeeding threshold.

3. The method of claim 2, wherein the method further comprising the step of:

measuring a round trip delay from the receiving device, requesting a recovery packet to the feedback message comprising the packet identifier of the recovery packet, and waiting the at least one round trip delay before determining the packet recovery rate.

4. The method of claim 2, wherein the second downspeeding threshold is in the range 0.6-1.0, preferably 0.8.

5. The method of claim 1, wherein the first downspeeding threshold is in the range 0.1-0.4, preferably 0.25.

6. The method of claim 1, wherein the step of initiating downspeeding of the media stream comprises instructing an encoder to reduce the transmission rate of the media stream.

7. The method of claim 1, wherein the step of initiating downspeeding of the media stream comprises selecting a media stream having a lower transmission rate than another media stream from an encoder providing a plurality of media streams at different transmission rates.

8. A computer-readable non-transitory storage medium storing instructions that when executed on a processor performs the method of claim 1.

9. A system for downspeeding of a media stream transmitted over a communication link from a sender device to a receiving device, the system comprising:

a sender device comprising a processor configured to:

map, for each packet in the media stream, a packet identifier, a transmission timestamp and a packet size;

receive, for each packet received at the receiving device, a feedback message, the feedback message comprising the packet identifier and an arrival timestamp;

determine a transmission rate for a first sliding window of N transmitted packets by dividing a packet size sum of the N transmitted packets with a time difference between the transmission time stamp of the last of the N transmitted packets and the transmission time stamp of the first of the N transmitted packets;

determine a received rate for the first sliding winding of the N transmitted packets by dividing the packet size sum of the N transmitted packets with a time difference between the arrival time stamp of the last of the N transmitted packets and the arrival time stamp of the first of the N transmitted packets; and initiate downspeeding of the media stream when for the first sliding window of the N transmitted packets the difference between the transmission rate and the received rate divided by the transmission rate is above a first downspeeding threshold.

10. The system of claim 9, wherein sender device is further adapted to:

transmitting recovery packets into the media stream, each recovery packet adapted to replace a missing packet of the media stream;

mapping for each recovery packet the packet identifier of the recovery packet and the packet identifier of the packet the recovery packet is adapted to replace;

determining a packet as missing when none of the feedback messages comprises the packet identifier of the packet;

determining a packet as recovered when a feedback message comprises the packet identifier of a recovery packet corresponding to the missing packet; and determining a packet recovery success rate by dividing a total number of packets determined as recovered within a second sliding window with a total number of packets determined as missing within the second sliding window; and initiating downspeeding of the media stream when the packet recovery success rate is below a second downspeeding threshold.

11. The system of claim 10, wherein the sender device is further adapted to: measure a round trip delay from the receiving device, request a recovery packet to the feedback message comprising the packet identifier of the recovery packet, and waiting the at least one round trip delay before determining the packet recovery rate.

12. The system of claim 10, wherein the second downspeeding threshold is in the range 0.6-1.0, preferably 0.8.

13. The system of claim 9, wherein the first downspeeding threshold is in the range 0.1-0.4, preferably 0.25.

14. The system of claim 9, wherein the sender device is further adapted to instruct an encoder to reduce the transmission rate of the media stream.

15. The system of claim 9, wherein the sender device is further adapted to select a media stream having a lower transmission rate than another media stream from an encoder providing a plurality of media streams at different transmission rates.

* * * * *